UNITED STATES PATENT OFFICE.

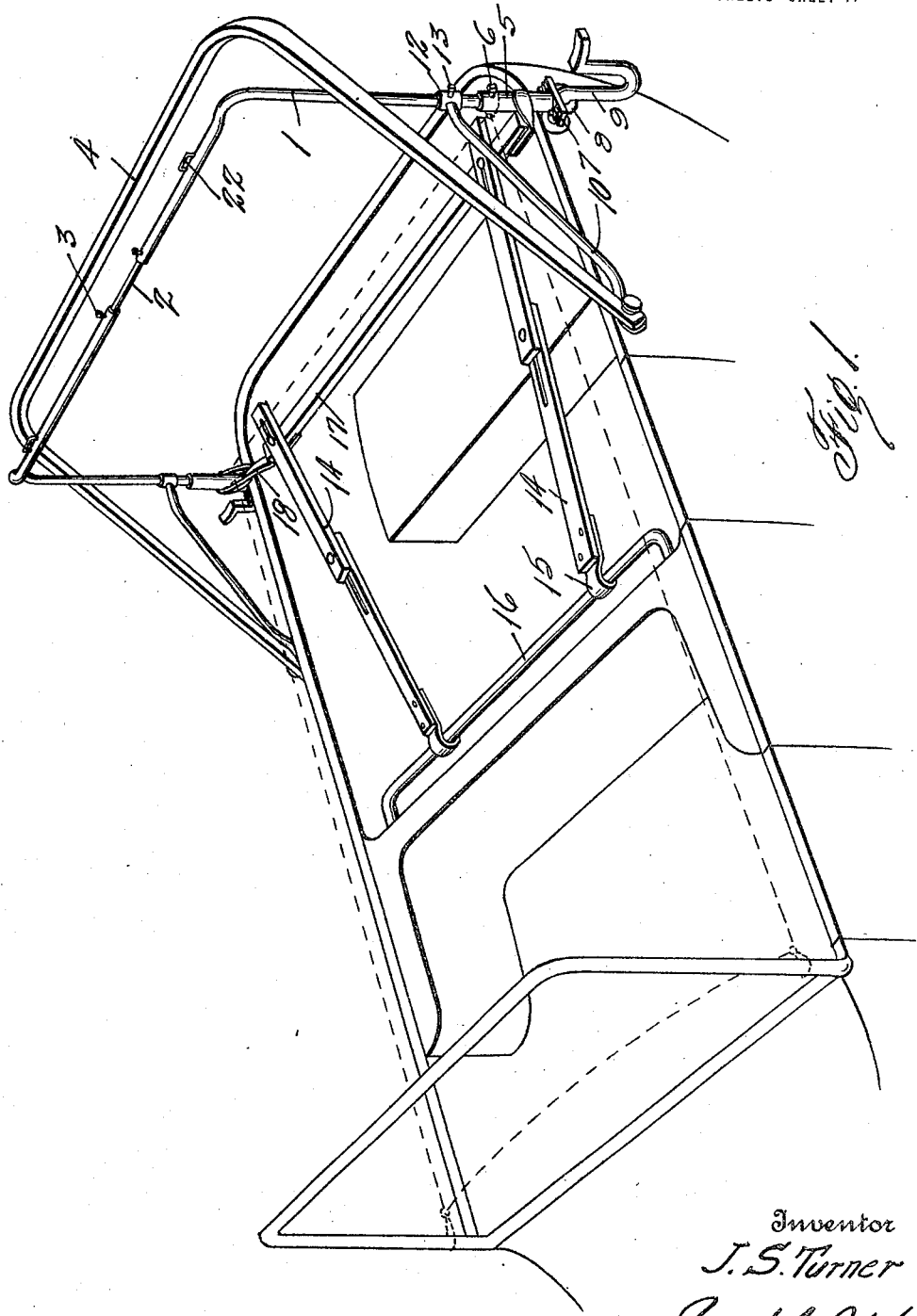

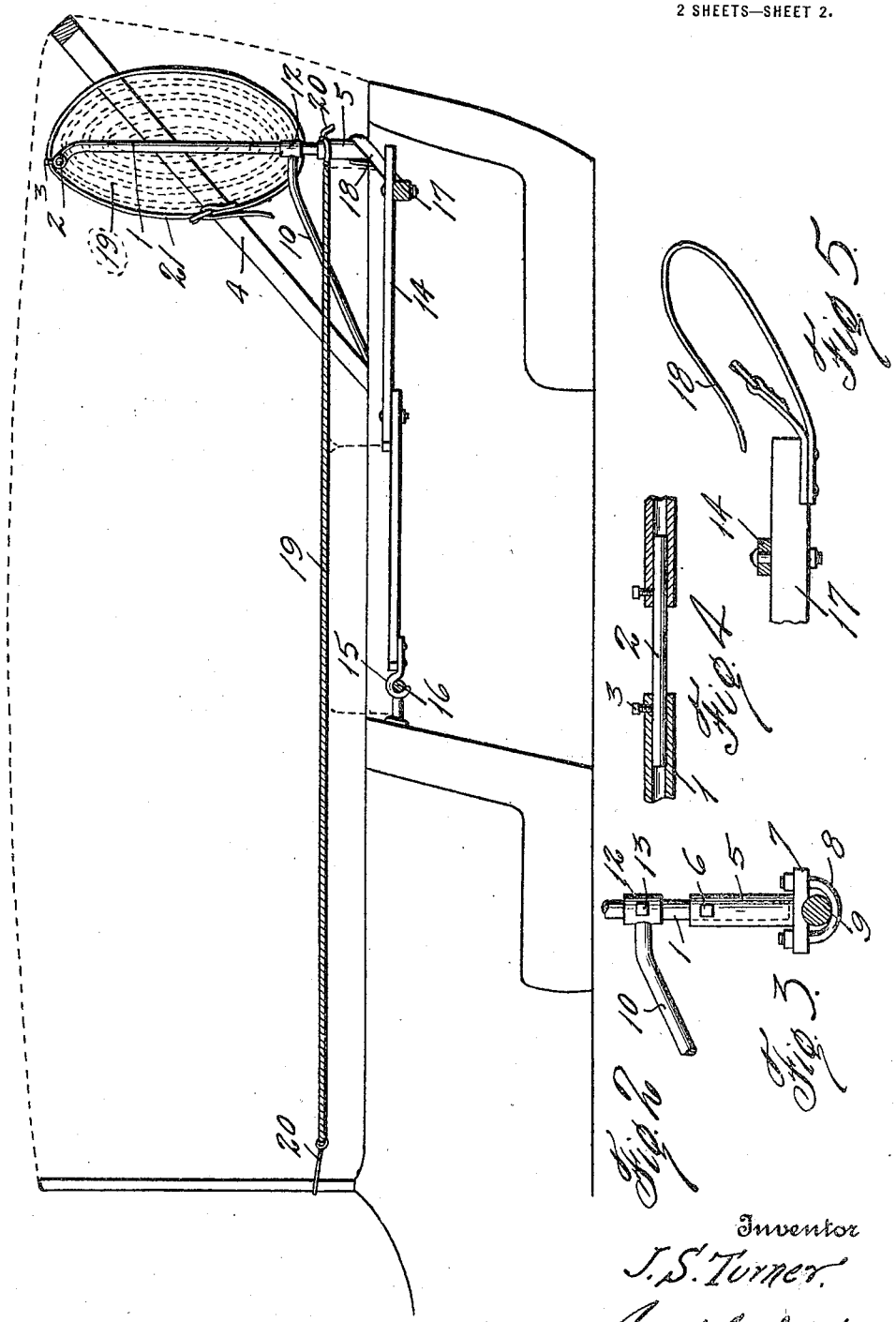

JOHN S. TURNER, OF DALLAS, TEXAS.

AUTOMOBILE BED-RACK.

1,325,967. Specification of Letters Patent. Patented Dec. 23, 1919.

Application filed June 30, 1919. Serial No. 307,584.

*To all whom it may concern:*

Be it known that I, JOHN S. TURNER, a citizen of the United States, residing at Dallas, in the county of Dallas and State of Texas, have invented certain new and useful Improvements in Automobile Bed-Racks, of which the following is a specification.

This invention relates to new and useful improvements in automobile bed racks.

A very comfortable bed can be made by utilizing the cushions of the seats and suitably supporting them between the front and rear seats.

My invention has particularly to do with means for supporting a bed roll at the rear of the car, so that after the cushions have been placed in position to form a mattress, the roll may be conveniently and expeditiously unwound and stretched over the cushions, thereby providing adequate bedding and covering. The bedding and covering are easily and readily rolled and fastened to the rack.

In carrying out the invention a rack is mounted over the back of the rear seat and a strip of duck has its rear edge fastened to the rack and is provided with straps or other means for fastening its end to the sides of the windshield. The strip is stretched over the cushions as the bedding is placed on said strip. In the morning the straps are unfastened from the windshield and the strip rolled up with the bedding inside. This bed roll is fastened in the rack and carried there during the day—being immediately available for use at any time.

The invention will be more readily understood from a reading of the following specification and by reference to the accompanying drawings, in which an example of the invention is shown and wherein:

Figure 1 is a perspective view of an automobile body with my rack attached thereto, the rear bow of the top also being shown, Fig. 2 is a longitudinal sectional view of the same, Fig. 3 is a detail of one of the rack sockets, Fig. 4 is a detail of the transverse adjustment, and Fig. 5 is a detail showing one of the seat supports.

In the drawings the numeral 1 designates a transverse arch member having a telescoping bar 2 at its center held by set screws 3 whereby the member may be adjusted to bodies of different width. The top of the member is offset laterally so that by reversing the member it may be positioned nearer the back bow 4. An upright socket 5 is provided at each side of the member 1, the lower ends of which telescope into the sockets and are fastened by set screws 6. The arch member may be adjusted vertically according to the height of the top of the car.

Each socket has a flange 7 at its bottom which is pivotally confined on the usual top prop bracket 9 by means of a U-bolt 8. The member 1 may be swung forward or rearward and for holding it in position braces 10 have their forward ends pivoted on the studs 11 of the bow 4 and carry collars 12 at their rear ends loosely surrounding the uprights of the arch member and fastened in position thereon by set screws 13.

For supporting the cushions I provide a pair of members 14, each longitudinally adjustable and having a hook 15 at one end for engaging on the robe-rail 16 of the car. The rear ends of the members are adjustably supported on a cross-bar 17 which has flexible loops 18 at each end engaging over the sockets. The front and rear seat cushions are placed on the members 14 as shown and form a mattress. A strip 19 of duck or other suitable material has straps 20 at each corner, the rear straps being tied around the sockets and the front straps being tied to the posts of the windshield. The bedding (not shown) is spread over the strip. The cushions support the bodies of the sleepers and the forward position of the strips supports their feet.

It will be seen that after unfastening the straps 20 the strip may be rolled up with the bedding inside. The bed roll thus formed is positioned within the arch member 1. Straps 21 held in place by keepers 22 on the top of the member 1, are passed around the bed roll thereby holding the latter in the rack. The supporting members 14 may be stored under the rear seat or elsewhere and the cushions replaced. The bed roll as carried in the rack is out of the way and available for immediate use and the strip 19 covers and protects the bedding. The rack may be attached to any car without altering or defacing the same.

What I claim is:

1. The combination with the fixed brackets of an automobile body, of an arched member having a transverse element and upstanding legs, the transverse element being spaced above the automobile body for a substantial distance, sockets angularly adjustably mounted upon the brackets and receiving the ends of the legs, diagonal rods adjustably connected with the legs and extending forwardly for connection with the automobile body, loops carried by the transverse element, and straps to be passed through the loops and to surround a roll of bed-clothes or the like.

2. The combination with the brackets of an automobile body, of an arched member having a transverse element and upstanding legs, the transverse element being spaced above the automobile body for a substantial distance, sockets angularly adjustably mounted upon the brackets and receiving the ends of the legs, diagonal rods provided at their rear ends with sockets to receive the legs and being adjustable thereon, said diagonal rods extending forwardly for connection with the automobile body, and suspension means carried by the transverse element and adapted to connect a roll of bed-clothes or the like with the same.

3. The combination with the brackets of an automobile body, of an arched member having a transverse element and upstanding legs, the transverse element being spaced above the automobile body for a substantial distance, sockets secured upon said brackets and receiving the ends of the legs, and suspension means carried by the transverse element and adapted to connect a roll of bed-clothes or the like with the same.

4. The combination with sockets for connection with an automobile body near its sides, of an arched member having a transverse element and legs, said legs being adapted to be removably held within the sockets, said transverse element being laterally offset with respect to the legs, and suspension means carried by the transverse element.

In testimony whereof I affix my signature.

JOHN S. TURNER.